United States Patent
Wienke et al.

(10) Patent No.: US 9,404,558 B2
(45) Date of Patent: Aug. 2, 2016

(54) HEAVY-DUTY CHAIN

(71) Applicant: DSM IP ASSETS B.V., Heerlen (NL)

(72) Inventors: Dietrich Wienke, Echt (NL); Roelof Marissen, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/433,719

(22) PCT Filed: Nov. 18, 2013

(86) PCT No.: PCT/EP2013/074075
§ 371 (c)(1),
(2) Date: Apr. 6, 2015

(87) PCT Pub. No.: WO2014/076279
PCT Pub. Date: May 22, 2014

(65) Prior Publication Data
US 2015/0247554 A1    Sep. 3, 2015

(30) Foreign Application Priority Data

Nov. 19, 2012    (EP) .................................... 12193174

(51) Int. Cl.
*F16G 13/12*    (2006.01)
*F16G 13/18*    (2006.01)
(Continued)

(52) U.S. Cl.
CPC . *F16G 13/18* (2013.01); *B66C 1/18* (2013.01); *D03D 3/00* (2013.01); *D03D 25/005* (2013.01); *F16G 13/12* (2013.01); *D10B 2401/063* (2013.01)

(58) Field of Classification Search
CPC ....... F16G 13/18; F16G 13/12; D03D 25/005; D03D 3/00; B66C 1/18; D10B 2401/063
USPC ............................................................ 59/78
See application file for complete search history.

(56) References Cited

U.S. PATENT DOCUMENTS

| 4,200,325 A | * | 4/1980 | Johnson | .................... B66C 1/18 |
| | | | | 294/74 |
| 4,758,765 A | * | 7/1988 | Mitsumori | ............. H05B 33/22 |
| | | | | 313/503 |

(Continued)

FOREIGN PATENT DOCUMENTS

| CN | 101346300 A | 1/2009 |
| EP | 0 205 960 | 12/1986 |

(Continued)

OTHER PUBLICATIONS

International Search Report for PCT/EP2013/074075 mailed Feb. 6, 2014.

(Continued)

*Primary Examiner* — David B Jones
(74) *Attorney, Agent, or Firm* — Nixon & Vanderhye P.C.

(57) ABSTRACT

The invention relates to a heavy-duty chain containing chain-links comprising synthetic polymeric yarns, wherein when said chain is kept at least taut onto an essentially planar surface, each chain-link has an orthographic projection onto said planar surface, said projection having a foot print area (A), wherein the foot print areas denoted as $A_1$ and $A_2$ of every two adjacent links are in a relation $80\% A_2 \leq A_1 \leq 100\% A_2$ with $A_1$ being the smallest of said two areas and wherein the projection is done in such a way that the ratio of the foot print areas $A_2$ to $A_1$ is maximized.

9 Claims, 2 Drawing Sheets

Figure 1:
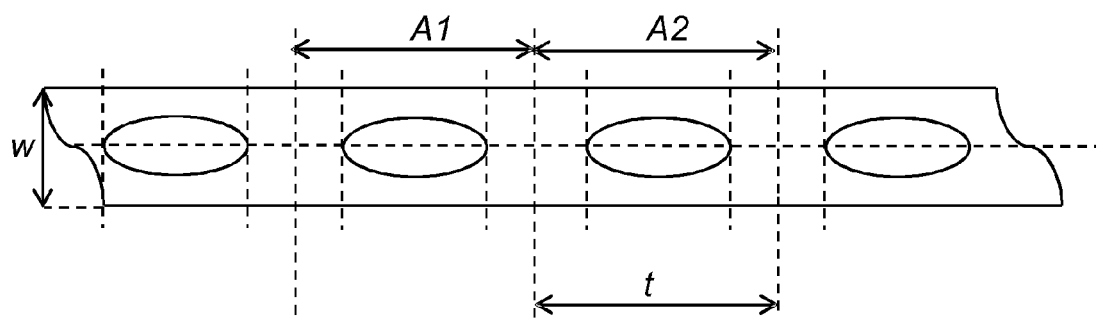

(51) Int. Cl.
  *D03D 25/00* (2006.01)
  *B66C 1/18* (2006.01)
  *D03D 3/00* (2006.01)

(56) References Cited

U.S. PATENT DOCUMENTS

| | | | |
|---|---|---|---|
| 4,779,411 A | 10/1988 | Kendall | |
| 4,856,837 A * | 8/1989 | Hammersla, Jr. | B66C 1/18 139/411 |
| 5,203,189 A * | 4/1993 | Lovejoy | B24D 13/06 451/534 |
| 8,171,714 B2 * | 5/2012 | Wienke | A61B 17/06166 474/203 |
| 8,468,793 B2 * | 6/2013 | Wienke | F16G 13/12 112/417 |
| 8,689,534 B1 * | 4/2014 | Chou | F16G 15/12 59/78 |
| 2002/0105199 A1 | 8/2002 | Formanek et al. | |
| 2009/0051181 A1 | 2/2009 | Goossens et al. | |
| 2011/0298231 A1 * | 12/2011 | Dohse | B66C 1/12 294/74 |
| 2012/0061980 A1 * | 3/2012 | Mami | B66C 1/18 294/74 |

FOREIGN PATENT DOCUMENTS

| | | |
|---|---|---|
| GB | 2 042 414 | 9/1980 |
| GB | 2 051 667 | 1/1981 |
| WO | WO 00/17085 | 3/2000 |
| WO | WO 01/73173 | 10/2001 |
| WO | WO 2008/089798 | 7/2008 |
| WO | WO 2009/115249 | 9/2009 |

OTHER PUBLICATIONS

T. Nakajima, "Advanced Fiber Spinning Technology", *Society of Fiber Science & Technology*, 1994, 21 pages.

* cited by examiner

HEAVY-DUTY CHAIN

This application is the U.S. national phase of International Application No. PCT/EP2013/074075, filed Nov. 18, 2013 which designated the U.S. and claims priority to EP Patent Application No. 12193174.5 filed Nov. 19, 2012, the entire contents of each of which are hereby incorporated by reference.

The invention relates to a heavy-duty chain containing chain-links comprising synthetic polymeric yarns, said chain been suitable for hoisting, fastening, lashing, conveying, suspending, lifting, securing, holding together heavy objects and/or for transmitting large amounts of mechanical power. The invention further relates to a process for making thereof and to various uses of said chain in various applications.

Heavy-duty chains comprising synthetic polymeric yarns are known in the art as for example those disclosed in WO 2008/089798 A1. Therein heavy-duty chains comprising ultra-high molecular weight polyethylene (UHMWPE) fibers are presented the chains being suitable to moor or anchor boats, to lash cargo in road, rail, water and air transportation or for conveying, hoisting, suspending or lifting applications. The known chains show high strength and durability when compared to other chains in the relevant art.

Another example of a chain comprising synthetic polymeric yarns is known from U.S. Pat. No. 4,779,411 disclosing a chain made from aromatic polyamide (aramid) multifilament yarns, sheathed with a woven outer fabric.

The above disclosures of known chains represent improvements in the state of the art, however there is a need to improve even further said chains. In particular it was observed that the known chains are less effective when used to brace, stabilize and hold cargo on e.g. a cargo pellet, and in particular cargo having an irregular shape. It was further found that in the known chains only part of the multifilament yarns contributes effectively to transmitting forces from one link to another, which may result in a chain having reduced efficiency. Also, the woven structures as described in the prior art show locations with pressure points where under load in contact with e.g. a cargo; hence, pressure damage to cargo is maximized. Moreover, the time for manufacturing the known chains is rather lengthy as every link forming thereof has to be individually produced.

An aim of the invention may therefore be to provide a chain which more effectively braces the cargo and holds it on e.g. a cargo pellet and/or necessitates shorter manufacturing time; and which preferably has an efficiency of at least equal with that of the known chains.

The invention provides therefore a heavy-duty chain containing chain-links comprising synthetic polymeric yarns, wherein when said chain is kept at least taut onto an essentially planar surface, each chain-link has an orthographic projection onto said planar surface, said projection having a foot print area (A), wherein the foot print areas denoted as $A_1$ and $A_2$ of every two adjacent links are in a relation:

$$80\% A_2 \leq A_1 \leq 100\% A_2$$

with $A_1$ being the smallest of said two areas and wherein the projection is done such a way that the ratio of the foot print areas $A_2$ to $A_1$ is maximized.

The heavy-duty chain of the invention, hereinafter referred to as the inventive chain, has not been manufacture hitherto and it represents a step forward in the field of chains suitable for hoisting, fastening, lashing, conveying, suspending, lifting, securing, holding together heavy objects and/or for transmitting large amounts of mechanical power. It was surprisingly found that the inventive chain may be manufactured to show high mechanical strength and/or good structural integrity while being lightweight.

Most importantly, the inventive chain braces the cargo in an efficient way and allows for the yarns forming thereof to effectively contributing in sharing the loads acting on said chain. The inventive chain may also present in particular the ability to withstand abrupt surges of dynamic loads without suffering a structural failure, and in particular may show that ability for a prolonged period of time and in a variety of typically harsh operational environments.

In a preferred embodiment, the inventive chain contains yarns forming a continuous three dimensional (3D) network structure, such chain being hereinafter referred to as a 3D chain. By yarns forming a continuous 3D network structure is herein understood that yarns continuously pass between two adjacent links, i.e. without interruption, and they are arranged to form a 3D network in every link. A 3D network structure is typically obtained by consolidating and binding at least three sets of yarns, one set of said yarns forming a multi-layer warp structure, and the other two sets of said yarns being positioned horizontally and vertically in respect to the warp structure forming therefore a weft structure; preferably the at least three sets of yarns are orthogonal. Preferably, the 3D network structure is a 3D-woven structure, more preferably a 3D-woven multi-shuttle loom structure, since chain-links comprising thereof collapse to a lesser extent under large loads, in particular dynamic loads, maintaining their original shape in an effective way. A 3D-woven multi-shuttle loom structure is herein understood a structure wherein the binding of the at least three, preferably orthogonal, sets of yarns is carried out on a multi-shuttle loom machine. Such machines are well known in the art of 3D weaving. A 3D woven chain may also allow for a more efficient and higher responsive transfer of mechanical power across its mass, in particular over prolonged time periods. The 3D structure may also be chosen from the group consisting of a 3D-braided, a 3D-knitted, a 3D-stiched and 3D-noobed structure.

In a further preferred embodiment, the inventive chain comprises a layered structure, wherein a plurality of layers containing a woven fabric are stacked and preferably attached to each other preferably by sewing, and wherein links are formed into the layered structure by cutting holes along the structure in a preferably periodical fashion. The amount of layers and the size of the holes are dependent on the strength of the chain, the skilled person being able to determine these factors by routine experimentation. Preferably, said fabric has the shape of a strap, i.e. an elongated object having a length much larger that its transversal dimensions of e.g. width and thickness. An example of such a strap may be a belt with holes, such as a conveyer belt with holes. A chain link in such a strap construction with holes, e.g. a belt, is considered to be the portion delimited by a virtual median separation line between two neighboring holes, namely between the two neighboring lateral hole edges each corresponding one neighboring hole. One chain link in such construction has one hole. The preferred embodiment according to the present invention wherein the chain has a strap construction is schematically illustrated in FIG. 1, wherein t is the length of a chain link and w is the width of a chain link. Such straps can be readily made by weaving or knitting a multifilament yarns into any construction known in the art such as a plain and/or a twill weave construction. The straps preferably have a n-ply webbing construction, where n is preferably at least 2, more preferably at least 3 and most preferably at least 4. The width of the straps may be varied over a large range, with widths of at least 1 cm, more preferably at least 2 cm, and preferred at most 30 cm and most preferred at most 15 cm. The thickness of the straps is preferably chosen such that the ratio of width to thickness is at least 5:1, more preferably at least 10:1, the ratio of width to thickness being preferably at most 40:1, and even more preferably at most 20:1. By limiting the width to thickness ratio of the straps, the links of the chain are more easily accessible for attachment means, such as hooks.

Preferably, the links of the chain according to the invention are fixed in one plane, i.e. they are not mobile in any direction within said chain.

The inventive chain may be characterized by 40% $A_2 \leq A_1 \leq 100\% A_2$; preferably 50% $A_2 \leq A_1 \leq 100\% A_2$; more preferably 60% $A_2 \leq A_1 \leq 100\% A_2$; even more preferably 70% $A_2 \leq A_1 \leq 100\% A_2$. The inventive chain is characterised by 80% $A_2 \leq A_1 \leq 100\% A_2$ and preferably by 90% $A_2 \leq A_1 \leq 100\% A_2$.

By "heavy-duty chain" is meant herein a chain having a breaking strength of at least 100 kN. Preferably, the breaking strength of the chain of the invention is at least 500 kN, more preferably at least 1000 kN, even more preferably at least 10000 kN, yet even more preferably at least 100.000 kN, most preferably at least $10^6$ kN.

By "heavy objects" is meant herein objects commonly understood as having a significant weight, e.g. transport freight containers, boats, ships, anchors, cars, trucks, aircrafts, trains, buses, moors, etc.

Within the context of the invention, a yarn is understood to be an elongated body comprising a plurality of fibres. By "fibre" is herein understood an elongated body, e.g. a body having a length and transverse dimensions, wherein the length of the body is much greater than its transverse dimensions. The term "fibre" as used herein may also include various embodiments, e.g. a filament, a tape, a strip, a ribbon and a yarn. The fiber may also have regular or irregular cross-sections. The fiber may also have a continuous and/or a discontinuous length. Preferably, the fiber has a continuous length, such fiber being known in the art as a filament.

By "orthographic projection" of an object e.g. a chain-link, is herein understood the projection of said object on a plane.

Preferably, the synthetic polymeric yarns have a tensile strength of at least 1 GPa, preferably at least 1.5 GPa, more preferably at least 2 GPa, even more preferably at least 3 GPa, yet even more preferably at least 4 GPa, most preferably at least 5 GPa. The titer of said yarns is preferably at least 100 denier, even more preferably at least 1.000 denier, yet even more preferably at least 2.000 denier, yet even more preferably at least 3.000 denier, yet even more preferably at least 5.000 denier, yet even more preferably at least 7.000 denier, most preferably at least 10.000 denier. Such yarns are commercially available. The tensile strength (GPa) of the synthetic polymeric yarns is measured on multifilament yarns with a procedure in accordance with ASTM D 885M, using a nominal gauge length of the fibre of 500 mm, a crosshead speed of 50%/min and Instron 2714 clamps of Fibre Grip D5618C type. On the basis of the measured stress-strain curve the modulus is determined as the gradient between 0.3 and 1% strain. For the calculation of the tensile strength, the relevant recorded figures of the tensile forces are divided by the titer.

The synthetic polymeric yarns may be produced according to any technique known in the art, preferably by melt, solution or gel spinning. The polymeric materials used to produce said yarns may be any material that can be processed into said yarns. Suitable examples include polyamides and polyaramides, e.g. poly(p-phenylene terephthalamide) (known as Kevlar®); poly(tetrafluoroethylene) (PTFE); poly(p-phenylene-2, 6-benzobisoxazole) (PBO) (known as Zylon®); LCP, e.g. Vectran® (copolymers of para hydroxybenzoic acid and para hydroxynaphtalic acid); poly{2,6-diimidazo-[4,5b-4',5'e]pyridinylene-1,4(2,5-dihydroxy)phenylene} (known as M5); poly(hexamethyleneadipamide) (known as nylon 6,6), poly(4-aminobutyric acid) (known as nylon 6); polyesters, e.g. poly(ethylene terephthalate), poly(butylene terephthalate), and poly(1,4 cyclohexylidene dimethylene terephthalate); polyolefins, e.g. homopolymers and copolymers of polyethylene and polypropylene; but also polyvinyl alcohols, polyacrylonitriles and the like. Also combinations of yarns manufactured from the above referred polymeric materials can be used for manufacturing the chain of the invention.

Preferably, the yarns used in accordance with the invention are polyolefin yarns; more preferably polyethylene or high density polyethylene (HDPE), or high performance polyethylene (HPPE), most preferably ultra-high molecular weight polyethylene (UHMWPE) yarns. In the context of the present invention, UHMWPE is herein defined as a polyethylene having an intrinsic viscosity (IV) of at least 3 dl/g, more preferably at least 4 dl/g, most preferably at least 5 dl/g. Preferably said IV is at most 40 dl/g, more preferably at most 25 dl/g, more preferably at most 15 dl/g. Preferably, the polyolefin yarns and in particular the UHMWPE yarns, have a tensile strength of at least 1.2 GPa, more preferably at least 2 GPa, preferably at least 3 GPa, yet even more preferably at least 3.5 GPa, yet even more preferably at least 4 GPa, most preferably at least 5 GPa. Preferably, the polyolefin yarns and in particular the UHMWPE yarns, have a tensile modulus of at least 40 GPa, more preferably at least 60 GPa, most preferably at least 80 GPa. The tensile strength (GPa) of the polyolefin yarns is measured on multifilament yarns with a procedure in accordance with ASTM D 885M, using a nominal gauge length of the fibre of 500 mm, a crosshead speed of 50%/min and Instron 2714 clamps of Fibre Grip D5618C type. On the basis of the measured stress-strain curve the modulus is determined as the gradient between 0.3 and 1% strain. For the calculation of the tensile strength, the relevant recorded figures of the tensile forces are divided by the titer.

Most preferably, the yarns used in accordance with the invention are gel spun UHMWPE yarns, i.e. yarns prepared by a gel spinning process, A suitable gel spinning process is described in for example GB-A-2042414, GB-A-2051667, EP 0205960 A and WO 0173173 A1, and in "*Advanced Fibre Spinning Technology*", Ed. T. Nakajima, Woodhead Publ. Ltd (1994), ISBN 185573 182 7. In short, the gel spinning process comprises preparing a solution of a UHMWPE of high intrinsic viscosity in a solvent, spinning the solution into filaments at a temperature above the dissolving temperature, cooling down the filaments below the gelling temperature, and drawing the filaments before, during and/or after at least partial removal of the solvent. Gel spun multifilament UHMWPE yarns have favorable mechanical properties, like a high modulus and a high tensile strength.

FIG. 1 schematically represents a preferred chain that has a strap construction, wherein t is the length of a chain link and w is the width of a chain link.

Figure 2:
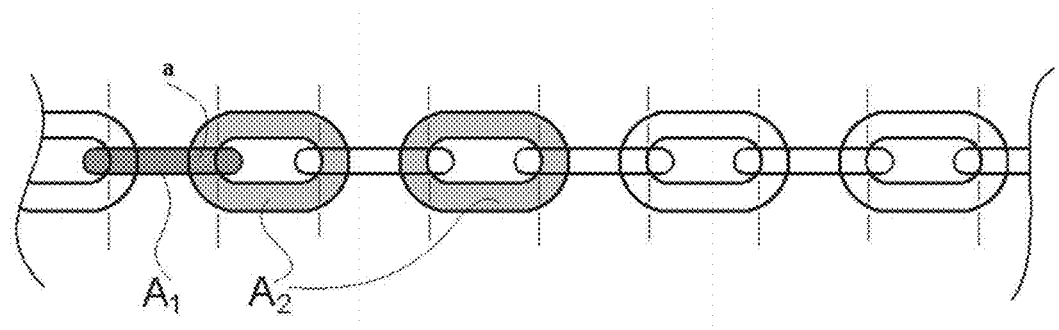

FIG. 2 schematically represents a chain as disclosed in the prior art, for instance in WO 2008/089798 A1, which is kept at least taut onto an essentially planar surface, each chain-link having an orthographic projection onto said planar surface, said projection having a foot print area (A), with $A_1$ and $A_2$ being the foot print areas of every two adjacent links and "a" is the overlap between two adjacent chain links.

METHODS FOR MEASURING

IV: the Intrinsic Viscosity is determined according to method ASTM D1601(2004) at 135° C. in decalin, the dissolution time being 16 hours, with BHT (Butylated Hydroxy Toluene) as anti-oxidant in an amount of 2 g/l solution, by extrapolating the viscosity as measured at different concentrations to zero concentration.

Breaking strength of chain, i.e. the force necessary to completely rupture a dry sample of a chain, is measured on a Zwick 1484 Universal test machine at a temperature of approximately 21° C., at a speed of 100 mm/min and using D-shackles with a ratio between the thickness of the shackles and that of the link connected thereat of about 5.

Example 1

A number of 6 woven straps were stacked upon each other and connected by sewing with an Extreme Tech® sewing yarn, supplied by Amann AG (Aughsburg, Del.). The straps were woven from 1760 dtex, UHMWPE yarns known as Dyneema® SK75. Every strap had a width of 47 mm, a thickness of 1.1 mm, a weight of 50 grams per running meter, a tensile strength of about 80 kN and an elongation at break of about 4%. Holes were cut every 40 mm, along the length of the stack with a laser beam. The ratio between the projections of two adjacent links was more than 90% and $A_1$ was approximately equal to $A_2$ for all possible projections (the chain of Example 1 was schematically illustrated in FIG. 1). The woven structures as described in this example do not show locations with pressure points where under load in contact with cargo. They are smooth, so pressure damage to cargo is minimized. When used to stabilize a cargo on a pellet, this chain braced the cargo very effectively, having a tensile strength of about 10.5 tons and a local breaking strength when using a hook or a shackle into a hole of about 2.4 tons.

The invention claimed is:

1. A heavy-duty chain containing chain-links comprising synthetic polymeric yarns, wherein when said chain is kept at least taut onto an essentially planar surface, each chain-link has an orthographic projection onto said planar surface, said projection having a foot print area (A), wherein the foot print areas denoted as $A_1$ and $A_2$ of every two adjacent links are in a relation:

$$80\% \, A_2 \leq A_1 \leq 100\% \, A_2$$

with $A_1$ being the smallest of said two areas and wherein the projection is done in such a way that the ratio of the foot print areas $A_2$ to $A_1$ is maximized.

2. The chain of claim 1 wherein said yarns are forming a continuous three dimensional (3D) network structure.

3. The chain of claim 2 wherein the 3D network structure is a 3D-woven structure, more preferably a 3D-woven multi-shuttle loom structure.

4. The chain of claim 1 comprising a layered structure, wherein a plurality of layers containing a woven fabric are stacked and preferably attached to each other preferably by sewing, and wherein links are formed into the layered structure by cutting holes along the structure in a preferably periodical fashion.

5. The chain according to claim 1, wherein the fabric has the shape of a strap.

6. The chain of claim 1 wherein $90\% \, A_2 \leq A_1 \leq 100\% \, A_2$.

7. The chain of claim 1 having a breaking strength of at least 100 kN.

8. The chain of claim 1 wherein said polymeric yarns have a tensile strength of at least 1 GPa.

9. The chain of claim 1 wherein said yarns are ultrahigh molecular weight polyethylene yarns.

* * * * *